United States Patent
Ahn et al.

(10) Patent No.: US 8,427,419 B2
(45) Date of Patent: Apr. 23, 2013

(54) LOCAL DIMMING DRIVING METHOD AND DEVICE OF LIQUID CRYSTAL DISPLAY DEVICE

(75) Inventors: Hee-Won Ahn, Gyeonggi-do (KR); Hee-Jung Hong, Seoul (KR); Kyung-Joon Kwon, Seoul (KR); Dong-Woo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 295 days.

(21) Appl. No.: 12/853,811

(22) Filed: Aug. 10, 2010

(65) Prior Publication Data
US 2011/0141154 A1 Jun. 16, 2011

(30) Foreign Application Priority Data
Dec. 11, 2009 (KR) .................. 10-2009-0123195

(51) Int. Cl.
*G09G 3/36* (2006.01)
*G09G 5/10* (2006.01)
*G09F 13/08* (2006.01)

(52) U.S. Cl.
USPC .......... 345/102; 345/690; 362/97.1; 362/97.2

(58) Field of Classification Search .................. 345/102, 345/690, 207, 214, 694; 362/600, 97.1–97.3
See application file for complete search history.

(56) References Cited

U.S. PATENT DOCUMENTS

| | | | |
|---|---|---|---|
| 7,113,164 B1 * | 9/2006 | Kurihara | 345/102 |
| 7,265,743 B2 * | 9/2007 | Funamoto et al. | 345/102 |
| 7,414,608 B2 * | 8/2008 | Funamoto et al. | 345/102 |
| 7,595,784 B2 * | 9/2009 | Yamamoto et al. | 345/102 |
| 7,956,838 B2 * | 6/2011 | Mizumaki | 345/102 |
| 8,054,286 B2 * | 11/2011 | Feng | 345/102 |
| 2007/0188439 A1 * | 8/2007 | Kimura et al. | 345/102 |
| 2007/0247532 A1 * | 10/2007 | Sasaki | 348/231.99 |
| 2007/0285379 A1 * | 12/2007 | Jung et al. | 345/102 |
| 2007/0296673 A1 * | 12/2007 | Kang et al. | 345/92 |
| 2008/0094346 A1 * | 4/2008 | De Greef | 345/102 |
| 2008/0204396 A1 * | 8/2008 | Otome | 345/102 |
| 2009/0115718 A1 * | 5/2009 | Qiao et al. | 345/102 |
| 2009/0251401 A1 * | 10/2009 | Gorog | 345/102 |
| 2009/0322800 A1 * | 12/2009 | Atkins | 345/690 |
| 2010/0020005 A1 * | 1/2010 | Jung et al. | 345/102 |
| 2010/0283802 A1 * | 11/2010 | Jung et al. | 345/690 |
| 2010/0328336 A1 * | 12/2010 | Si | 345/589 |
| 2011/0141154 A1 * | 6/2011 | Ahn et al. | 345/690 |

* cited by examiner

*Primary Examiner* — Dwayne Bost
*Assistant Examiner* — Scott Trandai
(74) *Attorney, Agent, or Firm* — Morgan, Lewis & Bockius LLP

(57) ABSTRACT

Disclosed herein is a local dimming driving method and device of an LCD device, which is capable of minimizing luminance deviation at the same gray scale due to a dimming difference between blocks. The local dimming driving method of the LCD device includes analyzing input image data in units of blocks and determining a local dimming value per block, performing spatial filtering with respect to the local dimming value per block, repeating spatial filtering by a predetermined repeat count, and controlling luminance of a backlight unit on a block-by-block basis using the local dimming value per block controlled by spatial filtering.

13 Claims, 7 Drawing Sheets

FIG. 1
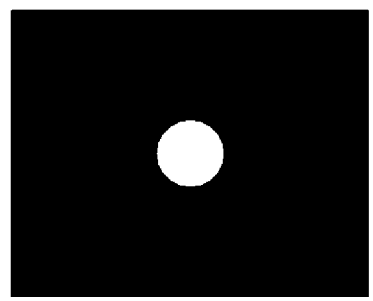
INPUT IMAGE
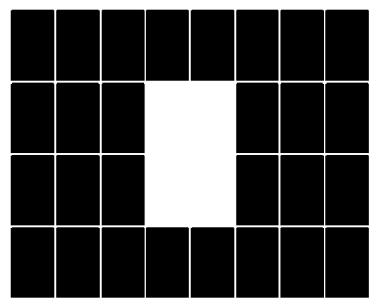
BACKLIGHT LOCAL DIMMING
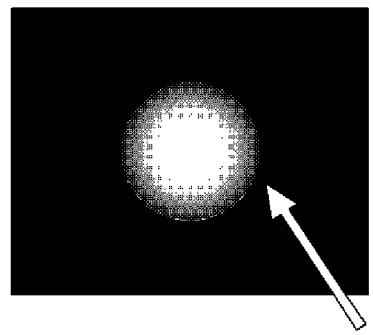
HALO PHENOMENON

LOCAL DIMMING DRIVING METHOD AND DEVICE OF LIQUID CRYSTAL DISPLAY DEVICE

This application claims the benefit of Korean Patent Application No. 10-2009-0123195, filed on Dec. 11, 2009, which is hereby incorporated by reference as if fully set forth herein.

BACKGROUND OF THE INVENTION

1. Field of the Invention

The present invention relates to a Liquid Crystal Display (LCD) device, and more particularly, to a local dimming driving method and device of an LCD device, which is capable of minimizing luminance deviation at the same gray scale due to a dimming difference between blocks.

2. Discussion of the Related Art

Recently, as an image display device, a flat panel display device such as a Liquid Crystal Display (LCD) device, a Plasma Display Panel (PDP) device, or an Organic Light Emitting Diode (OLED) device is mainly used.

An LCD device includes a liquid crystal panel for displaying an image using a pixel matrix using electrical and optical characteristics of liquid crystal with anisotropy of a refractive index and a dielectric constant, a driving circuit for driving the liquid crystal panel, and a backlight unit for irradiating light to the liquid crystal panel. Each pixel of the LCD device expresses gray scales, by changing a liquid crystal arrangement direction according to a data signal so as to control transmittance of light transmitted from the backlight unit through the liquid crystal panel and a polarization plate.

In the LCD device, the luminance of each pixel is determined by a product of the luminance of the backlight unit and light transmittance of liquid crystal according to data. The LCD device uses a backlight dimming method to analyze an input image, and to control a dimming value so as to control the luminance of the backlight unit and compensate data, in order to improve contrast ratio and reduce power consumption. For example, a backlight dimming method decreases the luminance of the backlight unit by decreasing the dimming value and increases the luminance of the backlight unit by compensating data, thereby reducing power consumption of the backlight unit.

Recently, as a backlight unit, a Light Emitting Diode (LED) backlight unit using an LED as a light source, which has high luminance and low power consumption as compared with the existing lamp, is used. Since the LED backlight unit can be controlled according to positions, the LED backlight unit may be driven by a local dimming method of dividing the LED backlight unit into a plurality of light emitting blocks and controlling the luminance of the backlight unit on a block-by-block basis. In the local dimming method, since the backlight unit and a liquid crystal panel are divided into the plurality of blocks, data is analyzed on a block-by-block basis so as to determine a local dimming value, and the data is compensated, it is possible to further improve contrast ratio and to further reduce power consumption.

However, in the local dimming method, a halo phenomenon that a light leakage difference is viewed at data with the same gray scale and, more particularly, black data due to a dimming difference between neighboring blocks occurs. For example, as shown in FIG. 1, if an image in which a bright object with a high gray scale is present on a dark background with a low gray scale is displayed by the local dimming method, a halo phenomenon wherein light leakage of a block for displaying the bright object appears at a dark block due to a dimming difference between the bright block and the dark block occurs, and thus image quality deteriorates.

SUMMARY OF THE INVENTION

Accordingly, the present invention is directed to a local dimming driving method and device of a Liquid Crystal Display (LCD) device that substantially obviates one or more problems due to limitations and disadvantages of the related art.

An object of the present invention is to provide a local dimming driving method and device of an LCD device, which is capable of minimizing luminance deviation at the same gray scale due to a dimming difference between blocks.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a local dimming driving method of a liquid crystal display device includes analyzing input image data in units of blocks and determining a local dimming value per block, performing spatial filtering with respect to the local dimming value per block, repeating spatial filtering by a predetermined repeat count, and controlling luminance of a backlight unit on a block-by-block basis using the local dimming value per block controlled by spatial filtering.

The local dimming driving method may further include calculating a gain value using the local dimming value per block, and compensating the input image data using the gain value.

The repeat count of spatial filtering may be previously set by the steps of generating a light profile of a light source within the backlight unit, determining a straightness level and a diffusion level of light from the light profile, and setting the repeat count of spatial filtering in proportion to the straightness level and diffusion level of the light.

The calculating of the gain value may include calculating a first total quantity of light reaching each pixel when the overall luminance of the backlight unit has a maximum value, using the light profile, calculating a second total quantity of light reaching each pixel when the luminance of the backlight unit is controlled on the block-by-block basis, using the local dimming value per block and the light profile, and calculating a first gain value on a pixel-by-pixel basis by a ratio of the first total light quantity to the second total light quantity.

In another aspect of the present invention, a method of driving a liquid crystal display device includes supplying the compensated data to a liquid crystal panel using the local dimming driving method, and displaying the input image data by a combination of the luminance of the backlight unit controlled on the block-by-block basis and light transmittance controlled by the compensated data on the liquid crystal panel.

In another aspect of the present invention, a local dimming driving device of a liquid crystal display device includes an image analyzer analyzing input image data in units of blocks corresponding to light emitting blocks of a backlight unit, a dimming value decider determining a local dimming value per block according to the analysis result of the image analyzer, a spatial filter performing spatial filtering with respect to the local dimming value per block from the dimming value decider, to control the local dimming value per block, and outputting the controlled local dimming value per block, and a counter counting an output count of the spatial filter and controlling an input/output path of the spatial filter such that the spatial filter repeatedly performs spatial filtering by a predetermined repeat count.

The local dimming driving device may further include a gain value calculator calculating a gain value using the local dimming value per block from the dimming value decider, and a data compensator compensating the input image data using the gain value from the gain value calculator.

The local dimming driving device may further include an input selector located at the side of an input terminal of the spatial filter to select and output any one of an output signal from the dimming value decider and a feedback signal from the spatial filter to the spatial filter, under the control of the counter, and an output selector located at the side of an output terminal of the spatial filter to output the output of the spatial filter in order to drive the backlight unit or to feed back the output of the spatial filter to the input terminal of the spatial filter, under the control of the counter.

A light profile of a light source within the backlight unit may be generated, a straightness level and a diffusion level of light may be determined from the light profile, and the repeat count of spatial filtering may be set in proportion to the straightness level and diffusion level of the light.

The gain value calculator may calculate a first total quantity of light reaching each pixel when the overall luminance of the backlight unit has a maximum value, using the light profile, calculate a second total quantity of light reaching each pixel when the luminance of the backlight unit is controlled on the block-by-block basis, using the local dimming value per block and the light profile, and calculate a first gain value on a pixel-by-pixel basis by a ratio of the first total light quantity to the second total light quantity.

In another aspect of the present invention, a liquid crystal display device includes the local dimming driving device, a panel driver supplying the compensated data from the local dimming driver to a liquid crystal panel, a timing controller outputting the compensated data from the local dimming driving device to the panel driver and controlling driving timing of the panel driver, a backlight unit including a plurality of light emitting blocks to irradiate light to the liquid crystal panel, and a backlight driver driving the light emitting blocks using the dimming value per block from the local dimming driver.

The local dimming driver is built in the timing controller.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram showing a halo phenomenon which occurs at the same gray scale due to a dimming difference between blocks in a local dimming method of the related art;

DETAILED DESCRIPTION OF THE INVENTION

Reference will now be made in detail to the preferred embodiments of the present invention, examples of which are illustrated in the accompanying drawings.

Figure 2:
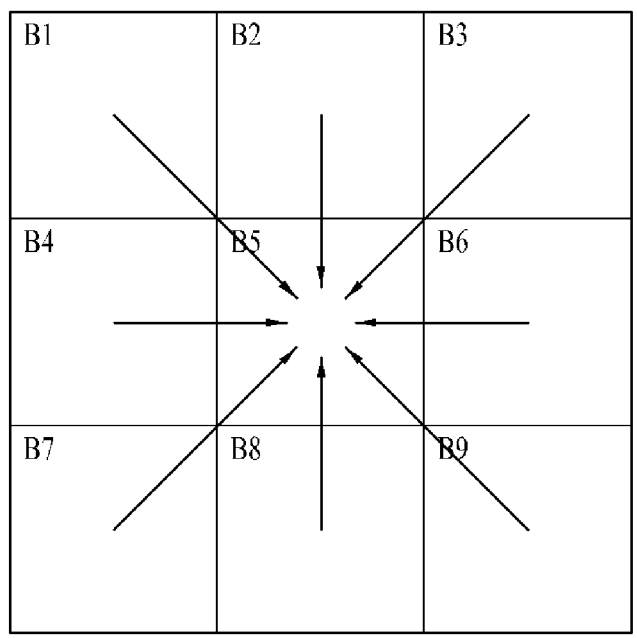
FIG. 2 is a diagram illustrating a spatial filtering method applied to the present invention.

A local dimming method of the present invention uses a low-pass filtering method using a spatial filter in order to reduce a halo phenomenon due to a dimming difference between blocks at the same gray scale. In a spatial filtering method, a local dimming value of a block is controlled in consideration of local dimming values of peripheral blocks, by applying specific weights to the local dimming values of the peripheral blocks and adding the local dimming values of the peripheral blocks, to which the specific weights are applied, to the local dimming value of the block. For example, as shown in FIG. 2, if a spatial filter with a window having a size of 3×3 is applied, a local dimming value of a block B5 is controlled by applying specific weights to the local dimming values of eight blocks B1 to B4 and B6 to B9 neighboring the block B5 in all directions and adding the local dimming values of the eight blocks, to which the specific weights are applied, to the local dimming value of the block B5. By controlling the local dimming value of the block B5, it is possible to reduce a dimming difference between neighboring blocks.

Figure 3:
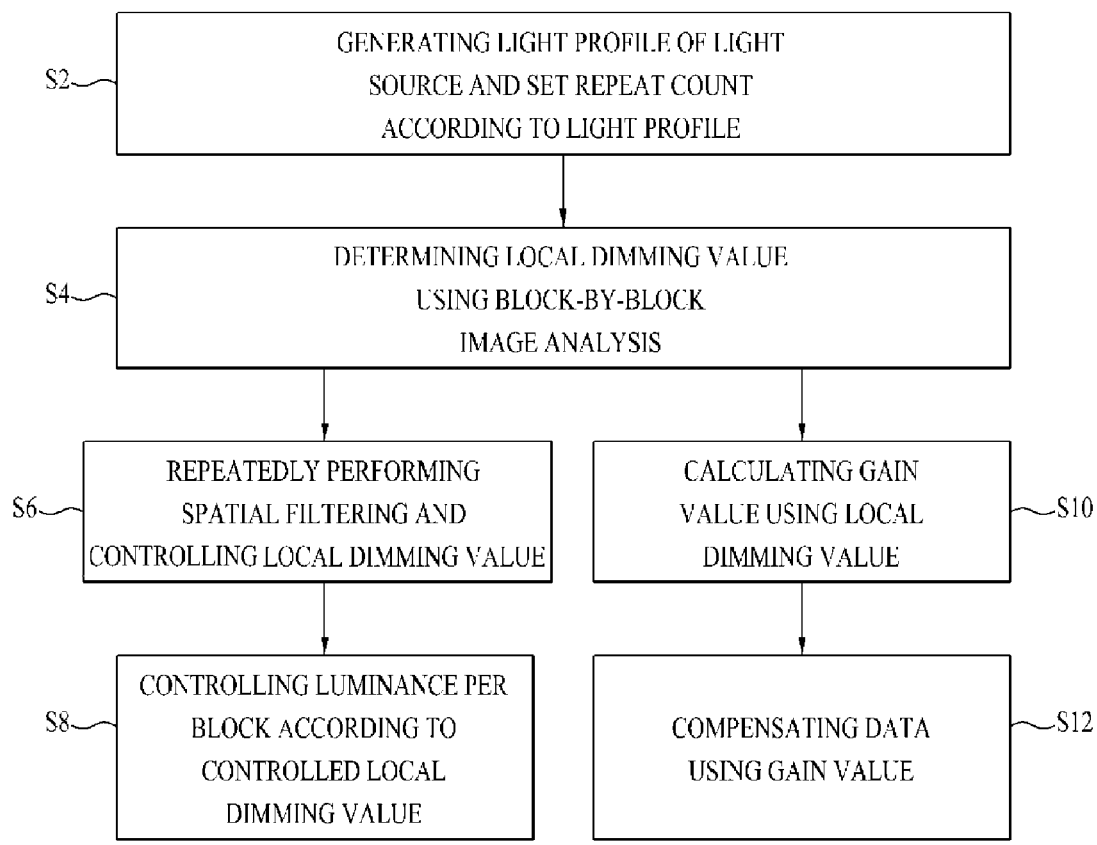
FIG. 3 is a flowchart illustrating a local dimming driving method of a Liquid Crystal Display (LCD) device according to an embodiment of the present invention.

FIG. 3 is a flowchart illustrating a local dimming driving method of a Liquid Crystal Display (LCD) device according to an embodiment of the present invention.

First, in step 2 (S2), a designer measures light emission characteristics of a light source applied to a backlight unit, regulates the measured light emission characteristics, generates a light profile using the regulated light emission characteristics, and determines a repetition count of spatial filtering according to the generated light profile. In the local dimming driving method, when a gain value applied upon data compensation is calculated, as shown in FIG. 3, it is used the light profile obtained by measuring and regulating the quantity of light emitted according to a distance from a light source. From the light profile shown in FIG. 4, it is determined a straightness level and diffusion level of light from a light source to a liquid crystal panel. The repeat count of spatial filtering is determined according to the straightness level and diffusion level of the light. As the straightness level and diffusion level of the light are increased, the repeat count of spatial filtering is increased, such that it is possible to reduce a luminance difference between blocks at the same gray scale.

In step 4 (S4), an input image is analyzed in units of blocks so as to determine a local dimming value per block. For example, maximum values per pixel are detected from the input image, the detected maximum values per pixel are divided into units of light emitting blocks, the maximum values per pixel are summed and averaged on a block-byblock basis, and an average value per block is detected. In addition, a local dimming value corresponding to the average value per block is determined. In general, since the local dimming value corresponding to the average value per block is previously set by the designer in the form of a look-up table, the local dimming value corresponding to the average value per block is selected and output from the look-up table on the block-by-block basis.

Figure 5:
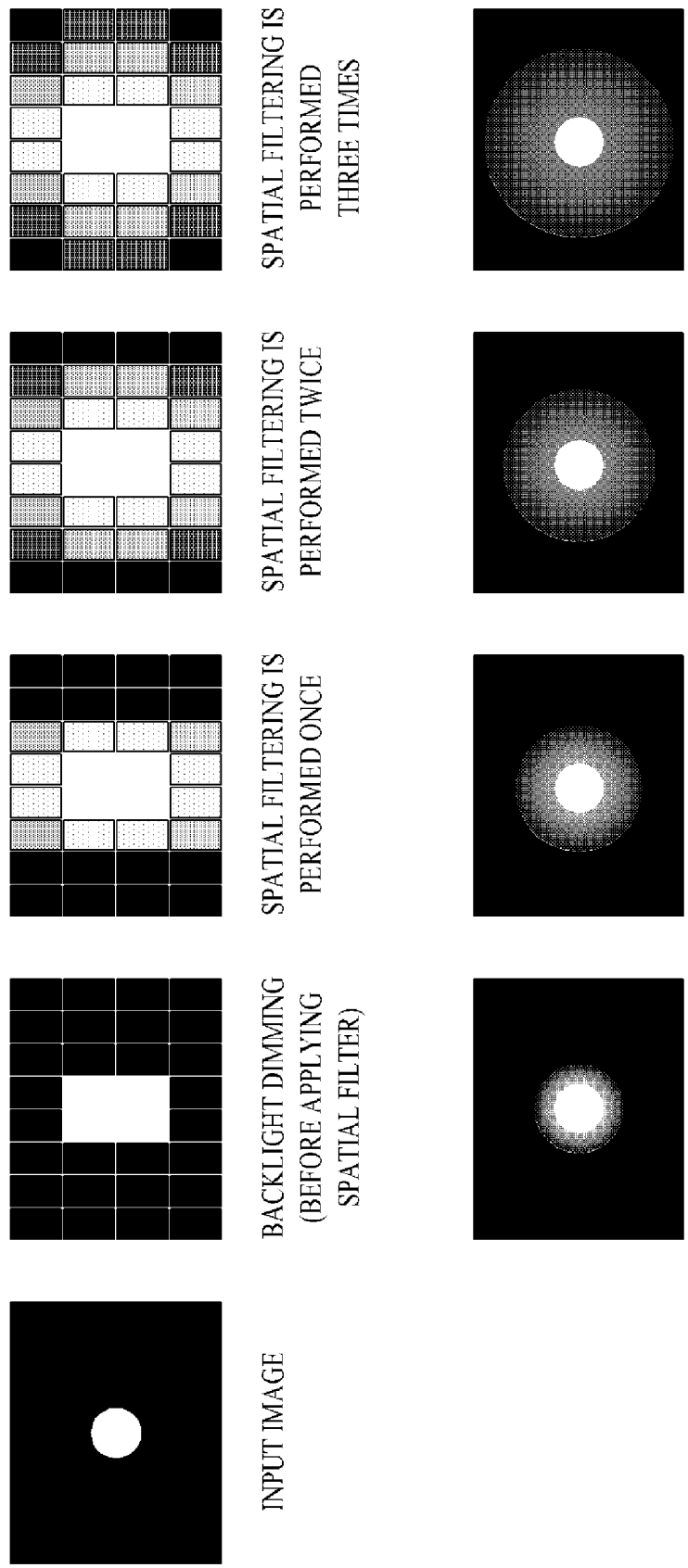
FIG. 5 is a diagram showing reduction of a dimming difference between blocks and reduction of a halo level according to repetition of spatial filtering according to the present invention.

In step 6 (S6), spatial filtering is performed with respect to the detected local dimming value per block and is repeated by the repeat count set in step 2 (S2). By adding the local dimming values of peripheral blocks to a local dimming value of a block so as to control the local dimming value per block, it is possible to reduce a dimming difference between blocks. Accordingly, as shown in FIG. 5, it can be seen that, as the repeat count of spatial filtering is increased, the local dimming value of the block and the local dimming values of the peripheral blocks are gradually decreased or increased. Spatial filtering is repeated at least twice. Therefore, as the repeat count of spatial filtering is increased, a dimming difference between blocks is decreased. Thus, a halo phenomenon is reduced to the point of being unable to be recognized by a viewer.

In step 8 (S8), the luminance of the backlight unit is controlled on the block-by-block basis using the local dimming value per block controlled by the repetition of spatial filtering.

In step 10 (S10), a gain value per pixel for data compensation is calculated using the local dimming value per block determined in step 4 (S4). In the local dimming driving method for controlling the luminance of the LED backlight unit on the block-by-block basis, since luminance is reduced as compared with a global dimming driving method for controlling the overall luminance of a backlight unit, the backlight luminance reduced by using the local dimming driving method is compensated using data. The quantity of light reaching each pixel is calculated from a light profile numerically representing the light emission characteristics of a light source according to distances, thereby calculating the gain value. In detail, the gain value is detected by a ratio of a first total quantity of light reaching each pixel from each light source (or each light block) when the overall luminance of the backlight unit has a maximum value to a second total quantity of light reaching each pixel from each light source (or each light block) when the backlight luminance is controlled by local dimming on the block-by-block basis, as expressed by Equation 1.

First gain value per pixel=(first total light quantity per pixel at maximum backlight luminance)/(second total light quantity per pixel at backlight luminance controlled by local dimming)   Equation 1

The first total light quantity per pixel is calculated by detecting and summing the quantity of light reaching each pixel from the light profile of each light source when the overall luminance of the backlight unit has a maximum value, and the second total light quantity per pixel is calculated by summing the quantity of light reaching each pixel from the light profile multiplied by the local dimming value when the backlight luminance is controlled by local dimming on the block-by-block basis. As expressed by Equation 1, the ratio of the first total light quantity per pixel to the second total light quantity is calculated as the gain value per pixel.

In step 12 (S12), the input data is multiplied by the calculated gain value so as to compensate the input data.

Figure 6:
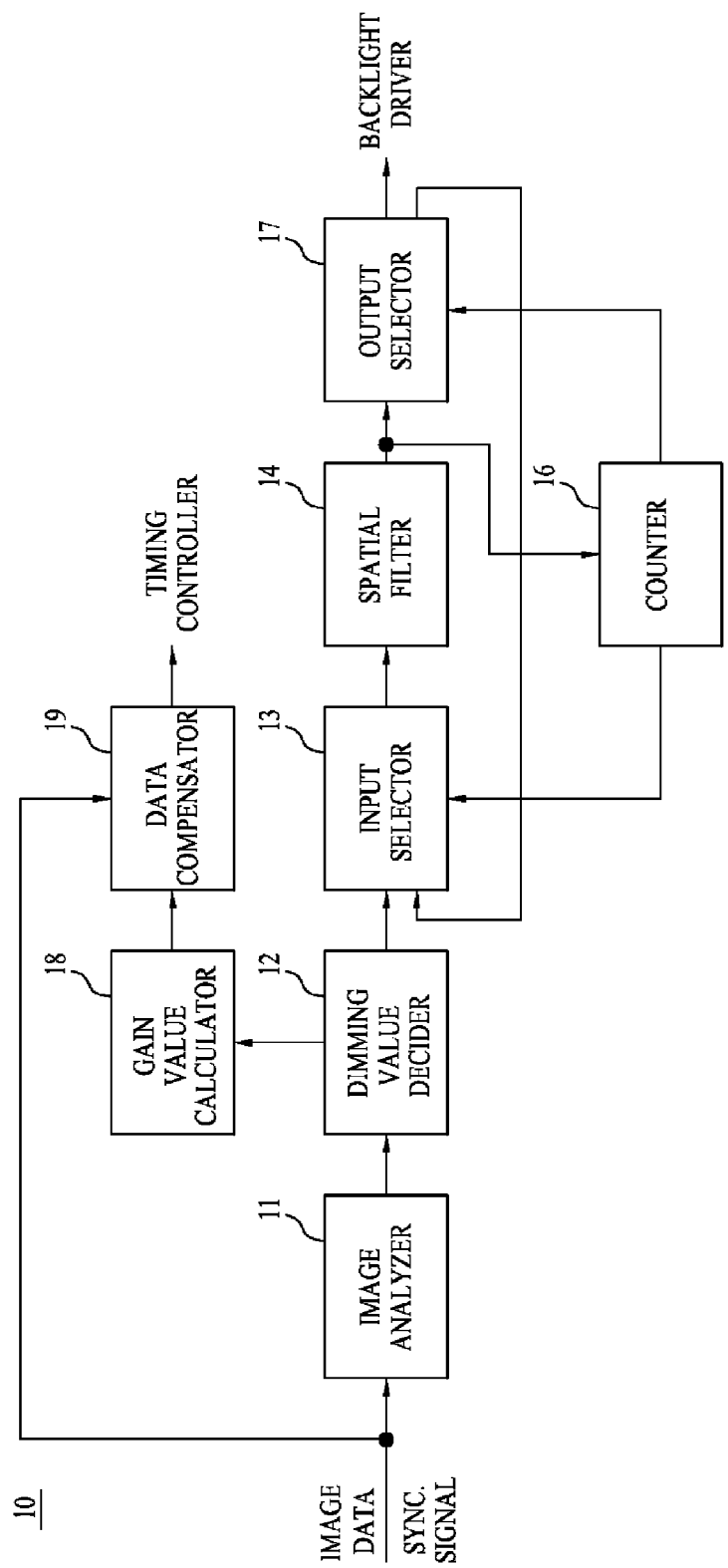
FIG. 6 is a block diagram showing a local dimming control device of an LCD device according to an embodiment of the present invention.

FIG. 6 is a block diagram showing a local dimming driver of an LCD device of an embodiment of the present invention.

The local dimming driver 10 shown in FIG. 6 includes an image analyzer 11, a dimming value decider 12, an input selector 13, a spatial filter 14, a counter 16, an output selector 17, a gain value calculator 18 and a data compensator 19.

The image analyzer 11 analyzes input image data in units of light emitting blocks of a backlight unit and outputs the block-by-block analysis result to the dimming value decider 12. In detail, the image analyzer 11 detects maximum values per pixel from the input image data, divides the detected maximum values per pixel in units of blocks, sums and averages the maximum values per pixel, and detects and outputs an average value per block to the dimming value decider 12.

The dimming value decider 12 determines and outputs a local dimming value per block corresponding to the average value per block from the image analyzer 11 to the spatial filter 14 and the gain value calculator 18. The dimming value decider 12 selects and outputs the local dimming value per block corresponding to the average value per block using a predetermined look-up table.

The spatial filter 14 performs spatial filtering with respect to the local dimming value per block received from the dimming value decider 12 through the input selector 13. The spatial filter 14 controls the local dimming value by applying specific weights to the local dimming blocks of peripheral blocks corresponding to a predetermined window and adding the local dimming values of the peripheral blocks, to which the specific weights are applied, to a local dimming value of a block, and outputs the controlled local dimming value, thereby decreasing a dimming difference between blocks.

Figure 4:
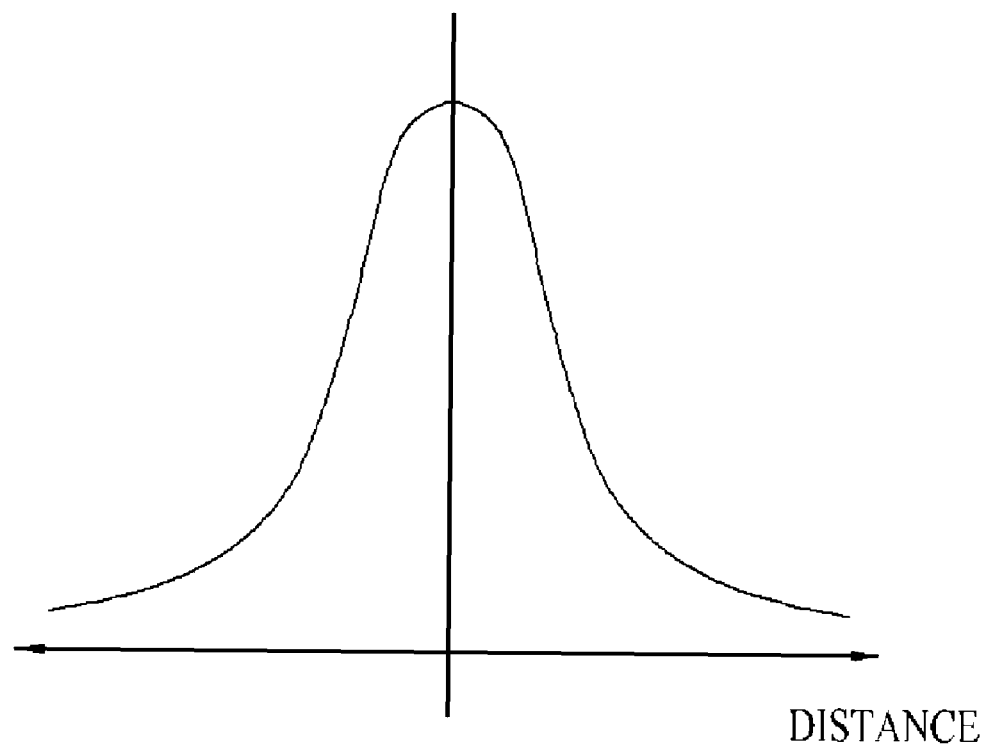
FIG. 4 is a diagram showing a light profile of a light source applied to the present invention.

The counter 16 counts the output count of the local dimming value from the spatial filter 14 such that the spatial filter 14 repeatedly performs filtering up to a predetermined repeat count. A designer stores the predetermined repeat count in the counter 16 in consideration of a light profile of a light source. The repeat count is set to two or more. The counter 16 controls the input selector 13 and the output selector 17 and feeds back the local dimming value output from the spatial filter 14 to the spatial filter 14, if the output count of the spatial filter 14 is less than the predetermined repeat count. Accordingly, since the spatial filter 14 repeatedly performs spatial filtering by the repeat count of the counter 16 so as to decrease the dimming difference between blocks, a halo phenomenon which occurs due to the dimming difference between blocks can be reduced to the point of being unable to be recognized by a viewer, without increasing the size of the window of the spatial filter 14, that is, a hardware capacity. If the output count of the spatial filter 14 reaches the predetermined repeat count, the counter 16 controls the input selector 13 so as to input the output from the dimming value decider 12 to the spatial filter 14 and controls the output selector 17 so as to supply the output of the spatial filter 14 to a backlight driver. As the repeat count of filtering of the spatial filter 14 is increased, the local dimming value of a block and the local dimming values of the peripheral blocks are gradually increased or decreased as shown in FIG. 4, thereby reducing the dimming difference between blocks.

The gain value calculator 18 calculates a gain value per pixel using the local dimming value per block from the dimming value decider 12. The gain value calculator 18 calculates a first total quantity of light reaching each pixel when the overall luminance of the backlight unit has a maximum value and a second total quantity of light reaching each pixel when the luminance of the backlight unit is controlled on the block-by-block basis by local dimming, calculates a gain value which is a ratio of the first total light quantity to the second total light quantity, and outputs the gain value to the data compensator 19.

The data compensator 19 multiplies the input data by the gain value from the gain calculator 18, compensates the input data in terms of luminance, and outputs the compensated input data to a timing controller. Therefore, the luminance reduced by local dimming can be increased by data compensation.

In the local dimming driving method and device of the present invention, by repeating spatial filtering by the predetermined repeat count, it is possible to reduce the dimming difference between blocks without increasing the size of the window of the spatial filter. Accordingly, as the repeat count of spatial filtering is increased, a halo phenomenon can be reduced to the point of being unable to be recognized by a viewer while decreasing the dimming difference between blocks.

Figure 7:
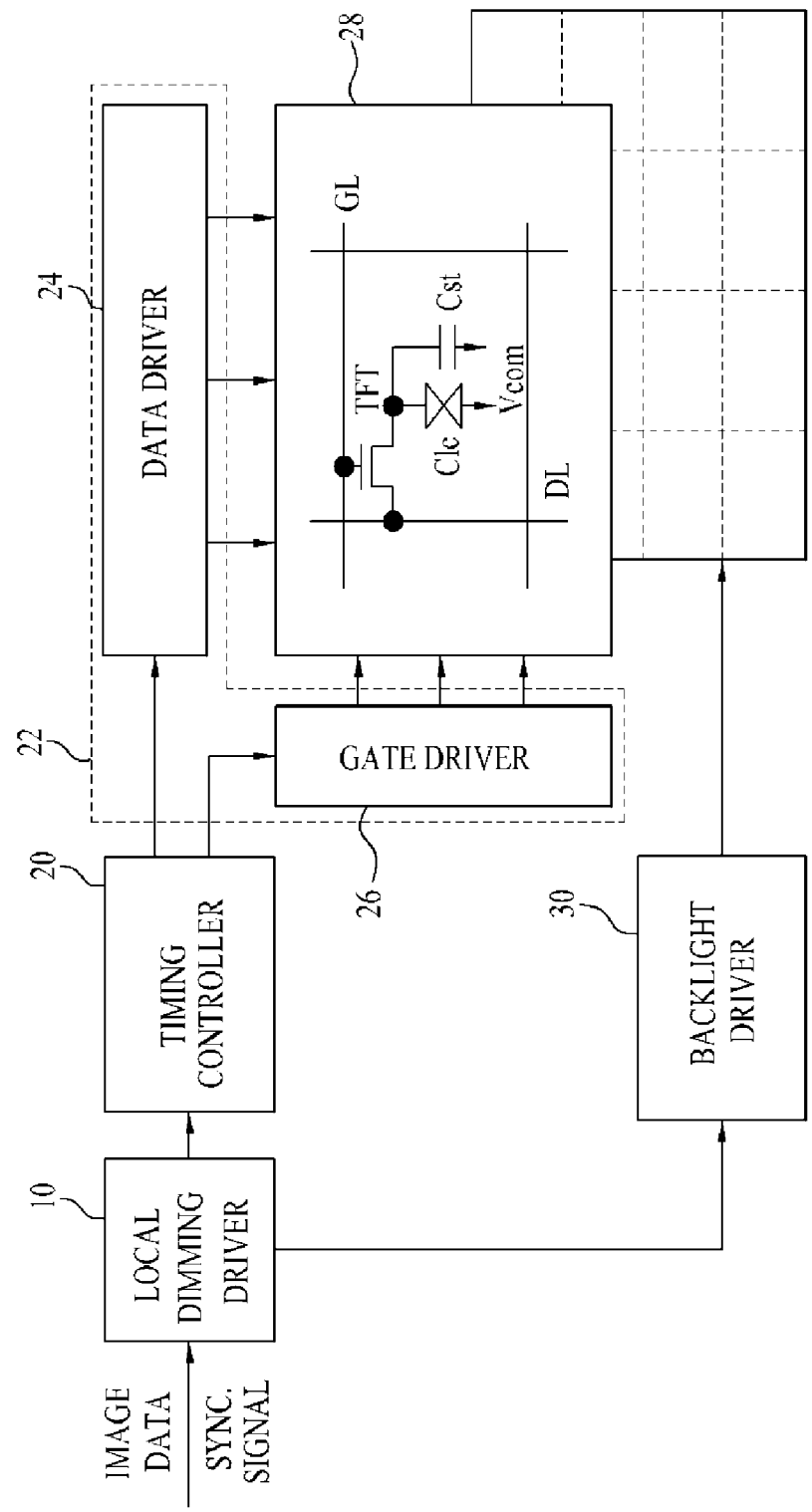
FIG. 7 is a diagram showing an LCD device according to an embodiment of the present invention.

FIG. 7 is a diagram showing an LCD device according to an embodiment of the present invention, to which the local dimming driver 10 shown in FIG. 6 is applied.

The LCD device shown in FIG. 7 includes a local dimming driver 10 for analyzing input image data in units of a plurality of blocks, determining a local dimming value, and compensating the data, a timing controller 20 for supplying output data from the local dimming driver 10 to a panel driver 22 and controlling driving timing of the panel driver 22, a backlight driver 30 for driving an LED backlight unit 40 on a block-by-block basis based on the local dimming value per block from the local dimming driver 10, and a liquid crystal panel 28 driven by a data driver 24 and a gate driver 26 of the panel driver 22. The local dimming driver 10 may be built in the timing controller 20.

The local dimming driver 10 analyzes data in units of a plurality of blocks using the input image data and a synchronization signal and determines a local dimming value per block according to the analysis result. The local dimming driver 10 repeats spatial filtering with respect to the local dimming value per block, controls the local dimming value, and outputs the controlled local dimming value. The local dimming driver 10 can reduce a dimming difference between blocks by the repeat count of spatial filtering, as described above. The local dimming driver 10 realigns the local dimming value per block controlled by the repetition of spatial filtering in connection order of the blocks within the backlight unit 40 and supplies the aligned value to the backlight driver 30. The local dimming driver 10 calculates a gain value per pixel using the local dimming value per block, compensates the luminance of the input data by multiplying the input image data by the gain value, and outputs the compensated data to the timing controller 20.

The timing controller 20 aligns the output data from the local dimming driver 10 and outputs the aligned data to the data driver 24 of the panel driver 22. The timing controller 20 generates a data control signal for controlling the driving timing of the data driver 24 and a data control signal for controlling the driving timing of the gate driver 26, using a plurality of synchronization signals, that is, a vertical synchronization signal, a horizontal synchronization signal, a data enable signal and a dot clock, received from the local dimming driver 10, and respectively outputs the data control signal and the gate control signal to the data driver 24 and the gate driver 26. The timing controller 20 may further include an over-driving circuit (not shown) for adding an overshoot value or an undershoot value according to a data difference between neighboring frames so as to change data, in order to improve a response speed of liquid crystal.

The panel driver 22 includes the data driver 24 for driving data lines DL of the liquid crystal panel 28 and the gate driver 26 for driving gate lines GL of the liquid crystal panel 28.

The data driver 24 converts digital image data from the timing controller 24 into analog data signal (pixel voltage signal) using a gamma voltage in response to the data control signal from the timing controller 20 and supplies the analog data signal to the data lines DL of the liquid crystal panel 28.

The gate driver 26 sequentially drives the gate lines GL of the liquid crystal panel 28 in response to the gate control signal from the timing controller 20.

The liquid crystal panel 28 displays an image through a pixel matrix in which a plurality of pixels is arranged. Each pixel exhibits a desired color by a combination of red, green and blue sub-pixels for controlling light transmittance by changing liquid crystal arrangement according to the data signal, the luminance of which is compensated. Each sub-pixel includes a Thin-Film Transistor (TFT) connected to each gate line GL and data line DL, a liquid crystal capacitor Clc connected to the TFT in parallel, and a storage capacitor Cst. The liquid crystal capacitor Clc charges a differential voltage between the data signal supplied to a pixel electrode through the TFT and a common voltage Vcom supplied to a common electrode and drives the liquid crystal according to the charged voltage so as to control light transmittance. The storage capacitor Cst stably maintains the voltage charged in the liquid crystal capacitor Clc.

The backlight driver 30 drives the LED backlight unit 40 on the block-by-block basis according to the dimming value per block from the local dimming driver 10 so as to control the luminance of the LED backlight unit 40 on the block-by-block basis. If the LED backlight unit 40 is driven in a state of being divided into a plurality of ports, a plurality of backlight drivers 30 for independently driving the plurality of ports may be included. The backlight driver 30 generates a Pulse Width Modulation (PWM) signal with a duty ratio corresponding to a local dimming value and supplies an LED driving signal corresponding to the generated PWM signal on the block-by-block basis, thereby driving the LED backlight unit 40 on the block-by-block basis. The backlight driver 30 sequentially drives the light emitting blocks using the local dimming value input in the block connection order from the local dimming driver 10 so as to control the luminance of the backlight unit 40 on the block-by-block basis.

Accordingly, the LCD device of the present invention displays the input image data by the product of the backlight luminance controlled on the block-by-block basis and the light transmittance controlled by the compensated data on the liquid crystal panel.

In the local dimming driving method and device of the liquid crystal display device of the present invention, by repeating spatial filtering using a window having a small size, it is possible to reduce luminance deviation which occurs due to a dimming difference between blocks at the same gray scale. Thus, a halo phenomenon can be reduced to the point of being unable to be recognized by a viewer.

In addition, as the repeat count of spatial filtering is increased, high luminance is widely diffused so as to further reduce a luminance difference between blocks. Therefore, a halo phenomenon can be reduced to the point of being unable to be recognized by a viewer, without increasing the capacity of a spatial filter in proportion of the size of the window of the spatial filter, thereby improving image quality.

In addition, by controlling the repeat count of spatial filtering according to a light profile of a light source, a halo phenomenon can be reduced according to the light emission characteristics of the light source to the point of being unable to be recognized by a viewer.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A local dimming driving method of a liquid crystal display device, the local dimming driving method comprising:
analyzing input image data in units of blocks and determining a local dimming value per block;
performing spatial filtering with respect to the local dimming value per block;
repeating spatial filtering by a predetermined repeat count; and
controlling luminance of a backlight unit on a block-by-block basis using the local dimming value per block controlled by spatial filtering,
wherein the repeat count of spatial filtering is previously set by:
generating a light profile of a light source within the backlight unit, the light profile being obtained by measuring and regulating the quantity of light emitted according to a distance from the light source;
determining a straightness level and a diffusion level of light from the light profile; and
setting the repeat count of spatial filtering in proportion to the straightness level and diffusion level of the light.

2. The local dimming driving method according to claim 1, further comprising:
calculating a gain value using the local dimming value per block; and
compensating the input image data using the gain value.

3. The local dimming driving method according to claim 2, wherein the calculating of the gain value includes:
calculating a first total quantity of light reaching each pixel when the overall luminance of the backlight unit has a maximum value, using the light profile;
calculating a second total quantity of light reaching each pixel when the luminance of the backlight unit is controlled on the block-by-block basis, using the local dimming value per block and the light profile; and
calculating a first gain value on a pixel-by-pixel basis by a ratio of the first total light quantity to the second total light quantity.

4. A method of driving a liquid crystal display device, the method comprising:
analyzing input image data in units of blocks and determining a local dimming value per block;
performing spatial filtering with respect to the local dimming value per block;
repeating spatial filtering by a predetermined repeat count;
controlling luminance of a backlight unit on a block-by-block basis using the local dimming value per block controlled by spatial filtering;
calculating a gain value using the local dimming value per block;
compensating the input image data using the gain value;
supplying the compensated data to a liquid crystal panel; and
displaying the input image data by a combination of the luminance of the backlight unit controlled on the block-by-block basis and light transmittance controlled by the compensated data on the liquid crystal panel,
wherein the repeat count of spatial filtering is previously set by:
generating a light profile of a light source within the backlight unit, the light profile being obtained by measuring and regulating the quantity of light emitted according to a distance from the light source;
determining a straightness level and a diffusion level of light from the light profile; and
setting the repeat count of spatial filtering in proportion to the straightness level and diffusion level of the light.

5. The method of driving the liquid crystal display device according to claim 4, wherein the calculating of the gain value includes:
calculating a first total quantity of light reaching each pixel when the overall luminance of the backlight unit has a maximum value, using the light profile;
calculating a second total quantity of light reaching each pixel when the luminance of the backlight unit is controlled on the block-by-block basis, using the local dimming value per block and the light profile; and
calculating a first gain value on a pixel-by-pixel basis by a ratio of the first total light quantity to the second total light quantity.

6. A local dimming driving device of a liquid crystal display device, the local dimming driving device comprising:
an image analyzer analyzing input image data in units of blocks corresponding to light emitting blocks of a backlight unit;
a dimming value decider determining a local dimming value per block according to the analysis result of the image analyzer;
a spatial filter performing spatial filtering with respect to the local dimming value per block from the dimming value decider, to control the local dimming value per block, and outputting the controlled local dimming value per block; and
a counter counting an output count of the spatial filter and controlling an input/output path of the spatial filter such that the spatial filter repeatedly performs spatial filtering by a predetermined repeat count,
wherein:
a light profile of a light source within the backlight unit is generated,
a straightness level and a diffusion level of light is determined from the light profile, and
the repeat count of spatial filtering is set in proportion to the straightness level and diffusion level of the light, and
wherein the light profile is obtained by measuring and regulating the quantity of light emitted according to a distance from the light source.

7. The local dimming driver according to claim 6, further comprising:
a gain value calculator calculating a gain value using the local dimming value per block from the dimming value decider; and
a data compensator compensating the input image data using the gain value from the gain value calculator.

8. The local dimming driving device according to claim 6, further comprising:
an input selector located at the side of an input terminal of the spatial filter to select and output any one of an output signal from the dimming value decider and a feedback signal from the spatial filter to the spatial filter, under the control of the counter; and
an output selector located at the side of an output terminal of the spatial filter to output the output of the spatial filter in order to drive the backlight unit or to feed back the output of the spatial filter to the input terminal of the spatial filter, under the control of the counter.

9. The local dimming driving device according to claim 7, wherein the gain value calculator:
- calculates a first total quantity of light reaching each pixel when the overall luminance of the backlight unit has a maximum value, using the light profile;
- calculates a second total quantity of light reaching each pixel when the luminance of the backlight unit is controlled on the block-by-block basis, using the local dimming value per block and the light profile; and
- calculates a first gain value on a pixel-by-pixel basis by a ratio of the first total light quantity to the second total light quantity.

10. A liquid crystal display device, comprising:
- a local dimming driver analyzing an input image data, generating a local dimming value and compensating an input image data according to the analyzing result;
- a panel driver supplying the compensated data from the local dimming driver to a liquid crystal panel;
- a timing controller outputting the compensated data from the local dimming driver to the panel driver and controlling driving timing of the panel driver;
- a backlight unit including a plurality of light emitting blocks to irradiate light to the liquid crystal panel; and
- a backlight driver driving the light emitting blocks using the dimming value per block from the local dimming driver, wherein the local dimming driver comprises:
- an image analyzer analyzing input image data in units of blocks corresponding to light emitting blocks of a backlight unit,
- a dimming value decider determining a local dimming value per block according to the analysis result of the image analyzer,
- a spatial filter performing spatial filtering with respect to the local dimming value per block from the dimming value decider, to control the local dimming value per block, and to output the controlled local dimming value per block,
- a counter counting an output count of the spatial filter and controlling an input/output path of the spatial filter such that the spatial filter repeatedly performs spatial filtering by a predetermined repeat count,
- a gain value calculator calculating a gain value using the local dimming value per block from the dimming value decider, and
- a data compensator compensating the input image data using the gain value from the gain value calculator, wherein:
- a light profile of a light source within the backlight unit is generated,
- a straightness level and a diffusion level of light is determined from the light profile, and
- the repeat count of spatial filtering is set in proportion to the straightness level and diffusion level of the light, and wherein the light profile is obtained by measuring and regulating the quantity of light emitted according to a distance from the light source.

11. The liquid crystal display device according to claim 10, the local dimming driver further comprising:
- an input selector located at the side of an input terminal of the spatial filter to select and output any one of an output signal from the dimming value decider and a feedback signal from the spatial filter to the spatial filter, under the control of the counter; and
- an output selector located at the side of an output terminal of the spatial filter to output the output of the spatial filter in order to drive the backlight unit or to feed back the output of the spatial filter to the input terminal of the spatial filter, under the control of the counter.

12. The liquid crystal display device according to claim 10, wherein the gain value calculator:
- calculates a first total quantity of light reaching each pixel when the overall luminance of the backlight unit has a maximum value, using the light profile;
- calculates a second total quantity of light reaching each pixel when the luminance of the backlight unit is controlled on the block-by-block basis, using the local dimming value per block and the light profile; and
- calculates a first gain value on a pixel-by-pixel basis by a ratio of the first total light quantity to the second total light quantity.

13. The liquid crystal display device according to claim 10, wherein the local dimming driver is built in the timing controller.

* * * * *